United States Patent
Chuard et al.

(10) Patent No.: US 10,145,513 B2
(45) Date of Patent: Dec. 4, 2018

(54) APPARATUS AND METHOD FOR CRYOCOOLED DEVICES THERMALIZATION WITH RF ELECTRICAL SIGNALS

(71) Applicant: ID QUANTIQUE SA, Geneva (CH)

(72) Inventors: Sylvain Chuard, Lausanne (CH); Félix Bussieres, Vessy (CH); Boris Korzh, Saint-Julien-en-Genevois (FR)

(73) Assignee: ID QUANTIQUE SA, Geneva (CH)

( * ) Notice: Subject to any disclaimer, the term of this patent is extended or adjusted under 35 U.S.C. 154(b) by 55 days.

(21) Appl. No.: 15/189,426

(22) Filed: Jun. 22, 2016

(65) Prior Publication Data

US 2016/0377230 A1    Dec. 29, 2016

(30) Foreign Application Priority Data

Jun. 23, 2015   (EP) .................................. 15173469

(51) Int. Cl.
   *F17C 13/00*      (2006.01)
   *F25D 19/00*      (2006.01)
   *G01J 5/06*       (2006.01)

(52) U.S. Cl.
   CPC ............ *F17C 13/00* (2013.01); *F25D 19/006* (2013.01); *G01J 5/061* (2013.01); *F17C 2203/00* (2013.01); *F17C 2205/00* (2013.01); *F25D 2400/28* (2013.01); *F25D 2400/30* (2013.01); *F25D 2400/40* (2013.01)

(58) Field of Classification Search
   CPC .......... F25B 17/08; Y02B 30/62; F17C 13/00; F17C 2203/00; F17C 2205/00; F25D 19/006; F25D 2400/28; F25D 2400/40; F25D 2400/30; G01J 5/061
   USPC ................................................. 62/259.2, 477
   See application file for complete search history.

(56) References Cited

U.S. PATENT DOCUMENTS

| | | | |
|---|---|---|---|
| 2010/0281885 A1* | 11/2010 | Black | F25B 9/10 62/46.1 |
| 2014/0137571 A1* | 5/2014 | Petroff | B01D 8/00 62/6 |

FOREIGN PATENT DOCUMENTS

| | | |
|---|---|---|
| EP | 1063482 | 1/2001 |
| WO | WO-0101048 | 1/2001 |
| WO | WO-2012168225 | 12/2012 |

* cited by examiner

*Primary Examiner* — Melvin Jones
(74) *Attorney, Agent, or Firm* — Dinsmore and Shohl, LLP

(57) ABSTRACT

Cryogenic device comprising at least two chambers at two different temperatures, a first chamber at a first temperature T1 accommodating a sample, and a second chamber at a second temperature T2 greater than T1 and being adapted to accommodate a cooling device, said cooling device being adapted to cool wirelines connecting said sample to an external element detector, wherein said cooling device is an IMS thermalization plate comprising at least one wire-guide having an input for plugging a wire line connected to the sample and an output for plugging a wire line connected to said external element, said wire-guide being thermally connected to the first chamber.

9 Claims, 4 Drawing Sheets

APPARATUS AND METHOD FOR CRYOCOOLED DEVICES THERMALIZATION WITH RF ELECTRICAL SIGNALS

CROSS-REFERENCE TO RELATED APPLICATION

This application claims priority to international application Serial No. EP 15 173 469.6, filed Jun. 23, 2015, the contents of which are incorporated herein in their entirety.

TECHNICAL FIELD

The present invention relates generally to the field of RF (Radio Frequency) signals and cryocooled devices, and more specifically to high performance thermalization of cryocooled devices with high bandwidth RF electrical connexions.

PRIOR ART

One of the well known issues concerning devices working at cryogenic temperatures is the minimal temperature that a cryocooling system is able to reach for a given thermal power dissipation. For a given cryocooling system, a user, who wants to work below a given temperature value, needs to be sure that the system's thermal power dissipation under cooling is below a corresponding threshold value of power dissipation. Such a threshold value depends on the thermal connection between the cryocooling system and device under cooling.

The first well known strategy in order to reduce as much as possible the thermal power dissipation of a device is to put it into a vacuum chamber. In this case, the power dissipation is limited by the thermal radiation of the device. However, when the device needs to be connected to any external system through a physical connection (e.g. a wire), the system power dissipation increases due to the wire thermal conduction. As an example, if a conductive element (such as a wire), is thermally connected directly from room temperature to a cryocooled system temperature all the heat propagating through the wire will increase the system (and therefore device) temperature. This temperature increase might affect the device performance if the system behavior is strongly temperature dependent as is for example the case of devices made of superconducting material.

One way of reducing the thermal power dissipation of a cryocooled device due to thermal conduction of a physical connection is usually described as "Thermalization" in cryostat working systems.

Thermalization is a process of reducing the temperature of conductive elements, used for the connection between a cryocooled device and its surrounding vacuum chamber, to reduce as much as possible the temperature difference between those elements and the cryocooled system at the connection point. One way to implement thermalization is to thermally connect the conductive elements to a mechanical piece which is at a low intermediate temperature, so that the heat, propagating through these elements, is pulled out at that point, rather than travelling onto the device or sample to be measured up to the cryocooled system. For example, if a wire is sufficiently thermally connected to a 30K temperature part of a cryostat, then most of the heat coming from the wire end at room temperature and propagating through this wire will be absorbed by the cryostat part and much less heat will propagate from the 30K temperature cryostat part to the cryocooled device or sample. As a consequence, this may impact and lower the sample performances which should be obtained under cryogenic conditions and moreover damage the structure to be measured or characterized. In general, the physical connections that can be done between a cryocooled system and the outside of the vacuum chamber are used for the propagation of physical signals such as electrical or optical signals. Those physical connections can be made of metal, glass or plastic depending on the type of signals that propagates through them. The challenge may therefore be generally described as having a good electrical conductivity while maintaining a good dissipation property at cryogenic temperature (for example 3K); more precisely the challenge is to maintain an RF line with minimal attenuation and minimal heat load to the sample.

A well known approach to model heat and thermal flow by conduction is described by the following simplified formula:

$$Q = k \times A \times \frac{T2 - T1}{L}$$

With:
"Q" is the heat flow in Watts
"k" is the conductivity of the material and usually measured in W/(m*K)
"A" is the cross-sectional area of the wire (m2)
"L" is the length of the wire (m)
"T2-T1" is the temperature gradient across the wire Several approaches have been proposed for cryostat thermalization process. Based on the simplified model, thermalization process consists in lowering the heat flow Q and according to the previous simplified model; three (3) main solutions families can be distinguished:

The 1st one is dealing with solutions lowering wire cross-sectional area (A) or wire material thermal conductive (k) by using for instance coaxial cables. Such type of cables are described as an example in U.S. Pat. No. 7,446,257 disclosing the use of a dielectric and insulating material surrounding the center conductor enables to define a cable with appropriate thermal and electrical properties to be used in a cryostat. Such coaxial cables for low temperature consist of low thermal conductivity metal materials on center and outer conductors, material of center and conductor may be chosen between Cupronickel, Stainless Steel, Niobium, Beryllium copper, Brass or other materials.

The 2nd one is dealing with solutions increasing L. Increasing wire length enables to increase the wire heat surface exchange within the cryostat, which enables to get appropriate dissipation property. Such solution can consist in circling cables around cold finger.

(Gorla et al., 2003) provide a thermalization solution disclosed for 1.2K and 1K working temperature. Proposed solution relies on a capillary tube in the line between the main bath and 1K plots that is thermalized on a copper screw at 1K temperature.

These two solutions are based on the optimization of 'A' and/or 'L' which is acceptable for wires made of glass or plastic where optical signal propagate, because this optimization doesn't reduce the propagation performances of the optical signal. On the other hand, for metallic wires, the electrical resistivity of these wires increases when their cross section decreases and their length increases. Hence, the optimization of those parameters for reducing the heat flow impacts the electrical properties of those wires. This is the reason why for metallic wires, it is the thermal conductivity which is most of all optimized (i.e. reduced).

Whereas the first two families are dealing with solutions dedicated to wire characteristics, the last one is dealing with solutions related to the wire environment and consists in using several means to dissipate thermal heat depending on the operating temperature range from few hundred Kelvin to mK.

More particularly and especially in the case of detecting weak signal infrared radiation, attempts are made to overcome noise that originates from unwanted IR flux that is out of the visible light and which is reflected on the internal components of the cryostat U.S. Pat. No. 8,664,606 discloses an apparatus working at temperatures from 50 to 200K.

Alternatively Sapphire may be used as a substrate for thermal dissipation, US 2015/0060190 discloses such type of solution where a Sapphire-PC board having high heat conductivity at low temperature is used to reduce noise and temperature during measurement.

(Casaburi & al., 2007) in the context of Niobium Nitride Single photon optical detector (NbN-based SSPD or SNSPD) describe the use of a chip carrier which ensures a good thermal contact during optical measurement. In this case, it is composed of a connector, a small printed PCB and a Copper (Cu) plate. This embodiment has been specifically used to fasten measurement characterization while reducing the probability of damaging a SSPD.

Additionally, in order to perform measurements of thermal and electrical characteristics, attenuation solutions are used. (Slichter & al., 2009) describe two set-ups using specific stripline designed to have significant attenuation at 1.3 GHz and 1.5 GHz. These specific realizations used in the mK temperature range show that the dynamic range of the measurement decreases with frequency due to the attenuation in the cryogenic coaxial lines. These proposed filters are therefore effective at suppressing high frequency electromagnetic noise without radiating non-equilibrium thermal noise; present a well-matched 500 impedance, thus well suited for measurements involving quantum devices.

Non-patent literature includes:

Casaburi A., Ejrnaes M, Quaranta O, Gaggero A, Mattioli F., Leoni R., Voronov B., Lisitskiy M., Esposito E., Nappi C., Cristiano R., Pagano S., Experimental characterization of NbN nanowire optical detectors with parallel stripline configuration, 2008, Journal of Physics Conference Series; 97(1):012265. DOI: 10.1088/1742-6596/97/1/012265

Gorla P., Bucci C., Pirro S., Complete elimination of 1K Pot vibrations in dilution refrigerators, 2003, Nuclear Instruments and Methods in Physics Research A 520, 641-643.

Slichter D. H., Naaman O., Siddiqi I., Millikelvin thermal and electrical performance of lossy transmission line filters, 2009, Applied Physics Letters, 94(19):192508-192508-3

Therefore existing solutions are complex to industrialize for cryostat application and to put in a production process. Moreover at high frequencies, circuits often require coaxial cables and connectors. The same issues of length, materials and lagging apply plus additional issues such as heat losses through the core and bandwidth. One of the main issues with coaxial cables is that while one can lag outer shield, it is difficult to pull the heat out of the inner core. This is because the insulating dielectric materials used between the shield and the core typically have low thermal conductivity. Moreover, although a huge variety of commercial heat spreader are used for electrical signal conditions near room temperature (in the range of 200-400K), none of these are specified for cryogenic temperatures (in the range of 0-150K).

Based on this prior art it is an object of the present invention to provide to cryostat users the possibility to thermalize wire lines in order to detect weak signals coming from sample measurement. This issue is particularly critical when dealing with RF signals and cryocooled devices, and more specifically high performance thermalization of cryocooled devices with high bandwidth RF electrical connections. Moreover, high frequency circuits often require coaxial cables and connectors. The same issues of length, materials and lagging apply plus additional issues such as heat loss through the core and bandwidth.

Therefore it is valuable to have a simple and customizable solution enabling wireline thermalization between a cryostat chamber at low temperature and the sample to be measured which is located in a chamber at cryogenic temperature.

SUMMARY OF THE INVENTION

The general idea of the invention is to connect the sample located in the cryostat chamber to be measured through wires to a specific plate enabling wire line thermalization between cryostat chambers. In order to achieve thermalization wire lines, an Insulated Metal Substrate (IMS) layer somehow similar than those used for heat dissipation in high temperature environment (e.g.: for power device or LED applications) has been adapted for cryostat functioning. Interestingly enough, electrical and thermal measurement shows IMS applicability for cryogenic temperatures, whereas it is generally specified for thermal cycling in the range of 230K-520K.

In order to achieve this, one need to be able to include an IMS plate within a cryostat while enabling wireline thermalization during its operation. This invention is solving this issue by disclosing an apparatus and the associated method. Alternatively, the IMS board used for wire line thermalization in cryostat environment may embed active devices for several functionalities such as processing or signal amplification.

A first aspect of the invention therefore relates to a cryogenic device comprising at least two chambers at two different temperatures, a first chamber at a first temperature T1 accommodating a sample, and a second chamber at a second temperature T2 greater than T1 and being adapted to accommodate a cooling device, said cooling device being adapted to cool wirelines connecting said sample to an external element, characterized in that said cooling device is a thermalization plate comprising at least one wire-guide having an input for plugging a wire line connected to the sample and an output for plugging a wire line connected to said external element, said wire-guide being thermally connected to the first chamber. Therefore, it is possible to redirect and dissipate the heat flow to the walls instead of the first chamber.

Advantageously, the thermalization plate is an IMS plate.

Still advantageously, the thermalization plate is mounted on a mechanical attachment made of a thermally conductive material and thermally connected to the first chamber.

Still advantageously, the thermalization plate embeds an active device for signal amplification or processing.

Still advantageously, the wirelines are coaxial cables.

till advantageously, the thermalization plate is located in the second chamber.

Still advantageously, the thermalization plate comprises at least a first layer comprising a material with high thermal conductivity in thermal contact with the first chamber; a second layer made of a thin dielectric material as an insulating layer; and a third layer is made of conductive material used for forming the circuitry enabling wire thermalization.

Still advantageously, the thermalization plate is adapted to fit a defined impedance. As an example wire length, material and depth on thermalization plate may be adapted to get 50Ω or 75Ω circuits.

Still advantageously, the chambers are electrically connected to each other through feeding through-holes provided in the walls of the chamber.

A second aspect of the invention is a process for installing an IMS thermalization board inside a cryogenic device of the first aspect of the invention comprising the steps of:

putting the IMS plate in contact with a part of cryostat at T1;

connecting the output cable on one of the output connectors of the plate 106;

connecting the input cable to the input connector on the same wire-guide as the output cable.

There are multiple benefits associated to this invention as it is adapted for industrialization and mass production, adapted to weak and high-frequency signal transmission and experiments and measurements confirm the particular suitability of this solution in the case of SNSPD or SSPD (Superconducting Nanowire Single-Photon Detector) cases. According to a particular embodiment of the invention the apparatus is further characterized in that the device to be measured is a SNSPD or SSPD device implemented in order to detect single photon signals at high throughput. Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1a—is a schematic view of a cryostat apparatus of the invention;

FIG. 1b—is an enlarged schematic view of a cooling system of included in the cryostat of FIG. 1a;

FIG. 2b—is a cross-section view of the thermalization plate of FIG. 2a;

DETAILED DESCRIPTION OF THE BEST MODE OF THE INVENTION

The invention description is based on the attached FIGS. 1a to 4b.

A best mode of the invention is described here where a thermalization plate is preferably made with IMS technology which combines the properties presented above. It is of particular interest, that IMS has never been specified at cryogenic temperatures, and the inventors surprisingly found that such a plate made with this technology was compatible with the thermal (high heat dissipation) and electrical requirements (impedance matching and high bandwidth) of the present device.

Figure 1B:
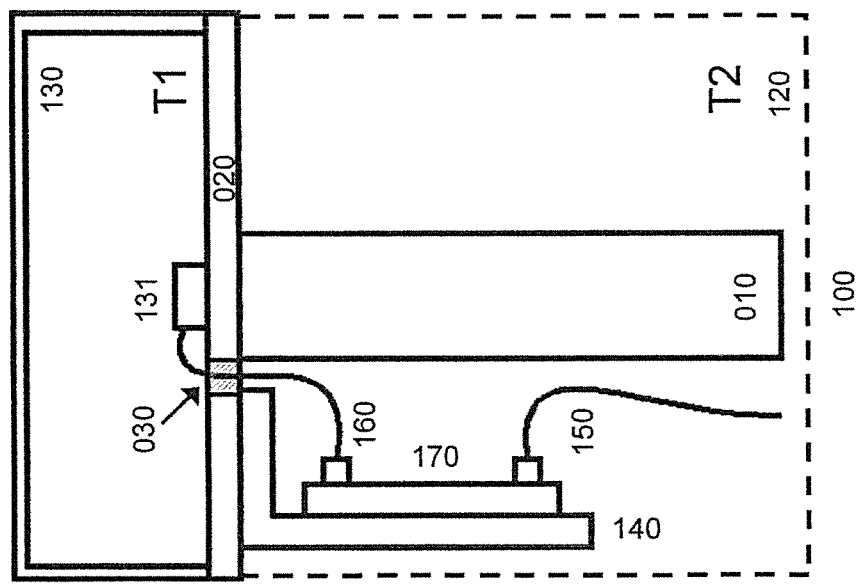
Figure 1A:
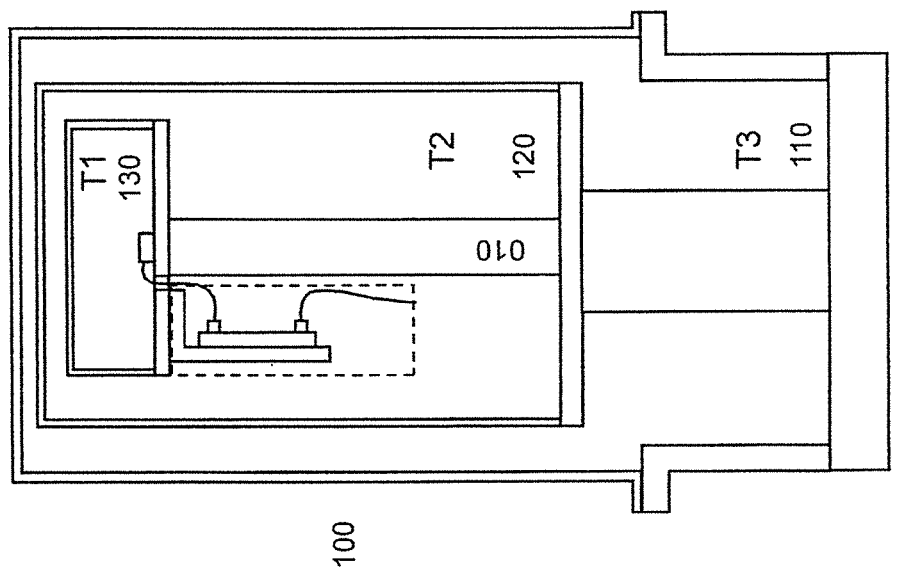

FIG. 1a shows a cryostat 100 is made of three chambers 110, 120 and 130 at three different temperatures T3, T2 and T1 with preferably, T3>T2>T1. As an example T3 may be in the order of magnitude of few hundred Kelvin (typically 200K), T2 at the order of 20K and T1 at the level of 2K. Each chamber is connected electrically to the other through feeding through-holes 030 provided in the walls of the chamber. These three chambers 110, 120, 130 enable to have a smooth temperature transition from T3 (typically in the range of 200K) in the third chamber 110 to T1 (typically in the range of 2K) in the first chamber 130 comprising an analyzed sample 131 by using cold finger 010 filed with He that is provided second chamber 120.

FIG. 1b is an enlarged view of chambers 120 and 130. One can see the sample 131 to be measured in the first chamber 130 in cryogenic conditions, that is at temperature T1 and that is attached to the cold finger 010 and thermally and mechanically anchored using appropriate screws in order to be cooled to cryogenic temperature. In order to acquire sample signals, sample 131 is connected to the higher temperature chamber 120 through wires 160 used for data acquisition. A first wire 160 is connected from the sample 131 to a thermalization plate 170. A second wire 150 is connecting the thermalizing plate 170 to the external environment. Preferably, the apparatus used for thermalization 170 is mechanically and thermally connected to the cryostat last chamber baseline 020 at T1 thanks to a mechanical attachment 140. Being thermally coupled to the first chamber 130, the mechanical attachment 140 acts like a thermal drain. This thermal drain ensures thermal dissipation and temperature transition from T2 to T1.

Therefore, the general idea of the invention is to connect the sample 131 located in the chamber 130 at cryogenic temperature T1 to a thermalization plate 170 with at least one wire 160. Further preferably, the thermalization plate 170 is connected to the external environment through a wire that may be a coaxial cable 150

Figure 2A:
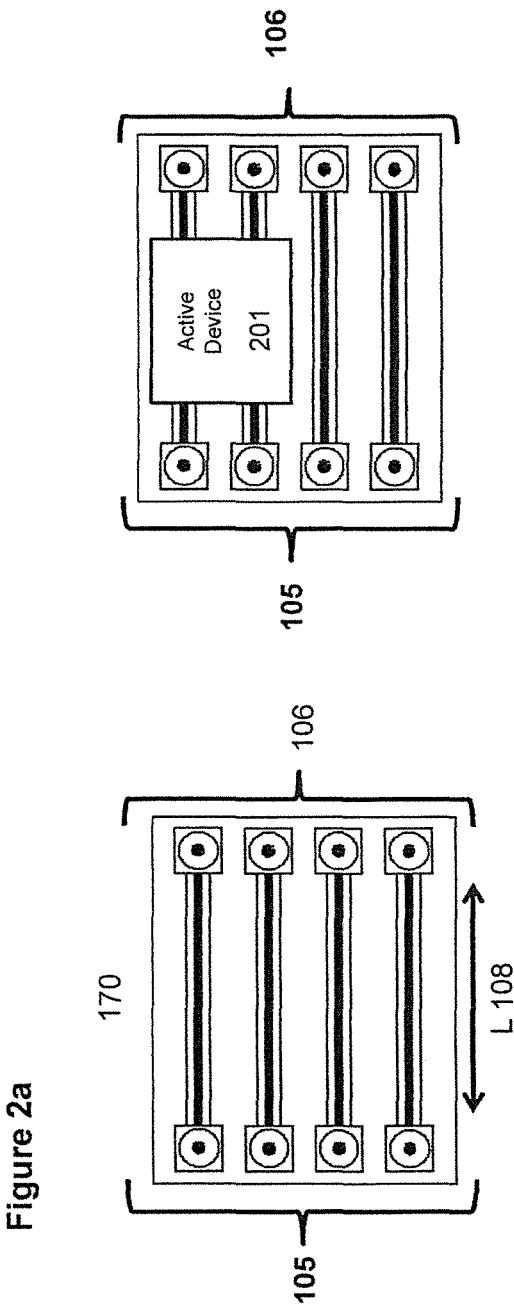
FIG. 2a—is an upper view of the thermalization plate with and without active devices.

FIG. 2a shows a preferred embodiment of the thermalization plate 170. This thermalization plate is preferably an IMS plate and is preferably composed of N wirelines connected to N inputs 105 ports and N output ports 106 connected by wires of length L 108. Thermalization plate input temperature is at T1 and output temperature is at T2. This plate is adapted with 50Ω impedance so that so that high-frequency (above 1 GHz) and weak signals may be transmitted without any attenuation. By doing so, one of the main advantages is that any suitable cable type may be used between the sample 131 and thermalization plate 170, whereas the output thermalization plate 170 may consist in cables adapted to avoid thermal dissipation such as coaxial cables. With this embodiment, wire length L 108 is adapted in order to ensure a gradient from T1 which is the temperature of the first cryostat chamber (at the level of 2K) at the input to T2 which is the temperature of the second cryostat chamber (at the level of 20K) at the output. Therefore, with this thermalization plate 170 one can, from the electrical point of view, adapt wirelines with high bandwidth signals which means, low attenuation at high frequencies and it is possible to design easily wirelines in order to adapt their impedance to the input/output impedance. Finally, from a thermal point of view the thermalization plate ensures that all parts of the coaxial cable, namely the shield and conductive core, are thermally anchored at the required temperature of T1, avoiding excessive heating of the sample.

The first thermalization plate 170 described is composed of inactive components, namely wires used to transmit electrical signals. Alternatively, the thermalization plate may embed active device for signal amplification or processing. This can have several advantages among them, the proximity to the signal source leading to lower interference pickup, lower noise or increase system bandwidth.

Figure 2B:
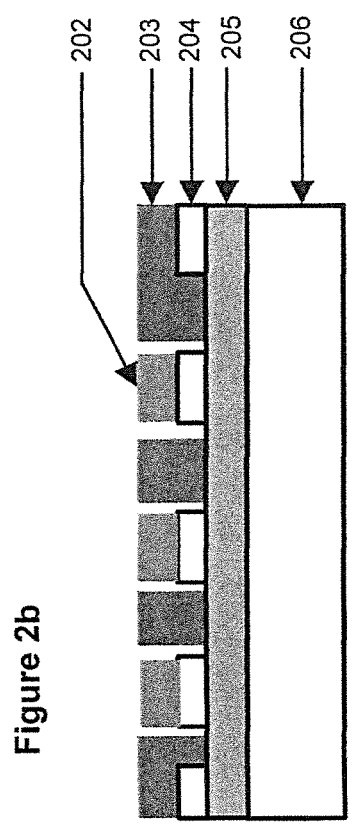

FIG. 2b shows the thermalization plate 170 structure based on IMS technology used within a cryostat and used for wirelines thermalization. It has been mechanically adapted as described below for working in cryostat conditions. The IMS plate is composed of at least five (5) layers each of them in charge of a specific function.

First layer 206 is dedicated to heat dissipation through conduction phenomenon, and consists in a layer made with a material with high thermal conductivity. As an example it may be Al or Cu. This heat dissipation layer helps to spread thermal energy at the lower bound of the thermalization plate.

Second layer 205 is an insulator layer made of a thin dielectric layer enabling to separate and discriminate electrically conductive layers from heat dissipation layer.

Third layer 204 is made of conductive material used for forming the circuitry enabling wire thermalization.

Above these conductive tracks, two additional layers 203, and 202 are preferably used for thermal and electrical insulation which are namely the solder mask and solder paste.

Figure 3:
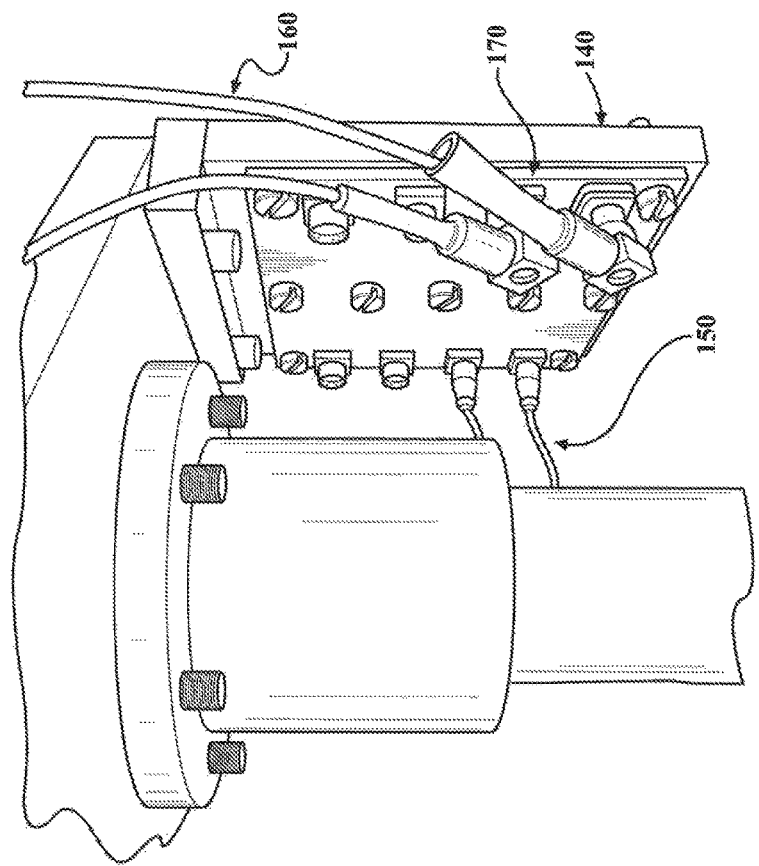
FIG. 3—is a picture and diagram of the method associated to the apparatus embodiment.
Figure 3:
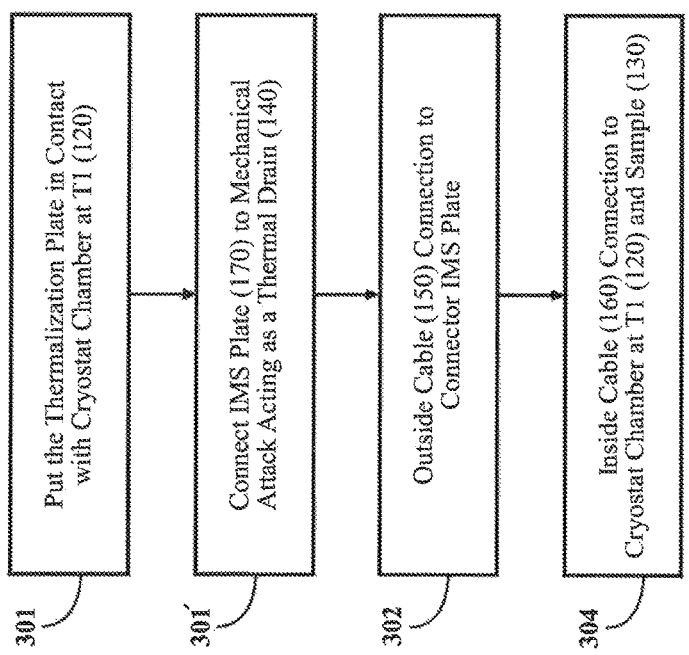

Therefore, wirelines realized on IMS board enables to thermalize wirelines from temperature T1 to temperature T2 and spread thermal power through thermal drain FIG. 3 depicts the IMS thermalization board, ready to be installed inside a cryostat. In order to get this IMS thermalization board within a cryostat, the following method may be used.

The first step 301 consists in putting the IMS plate 170 in contact with a part of cryostat at T1. The thermalization plate 170 may be placed outside the T1 chamber at cryogenic temperature 120. It is outside the T1 cryogenic chamber, and then the thermalization plate 170 may be fixed to a mechanical attachment 140 (optionally made of metal or the like) acting in this case as a thermal drain which can be considered as an additional step 301' of the present method.

The second step 302 consists in connecting the cable 150 coming from the outside of the chamber 110 at temperature T2 on one of the output connectors of the plate 106.

The third step 303 consists in connecting the corresponding cable 160 coming from the chamber 130 at temperature T1 to the connector 105 on the plate linked to the previously cited connector through the wire-guide. Note that it is important that two cables that have to be linked together are connected to the same wire-guide.

Figure 4A:
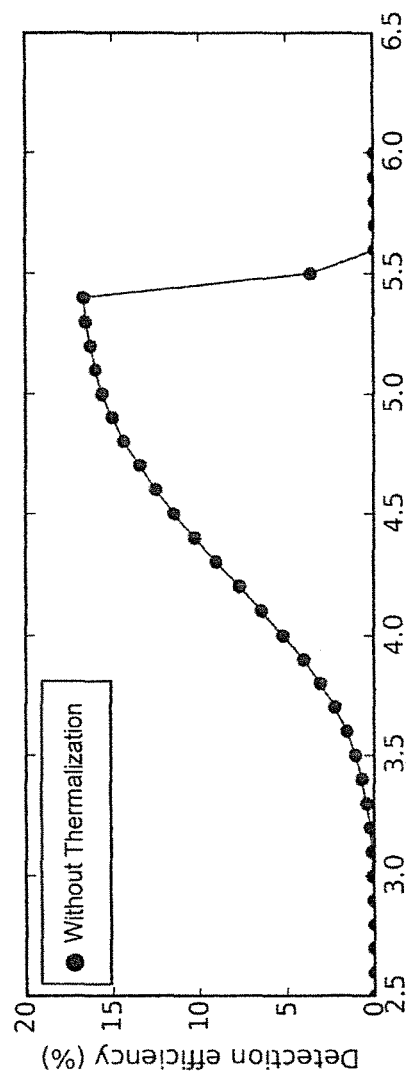
FIG. 4a—is a graph presenting measurement results without the thermalization plate.
Figure 4B:
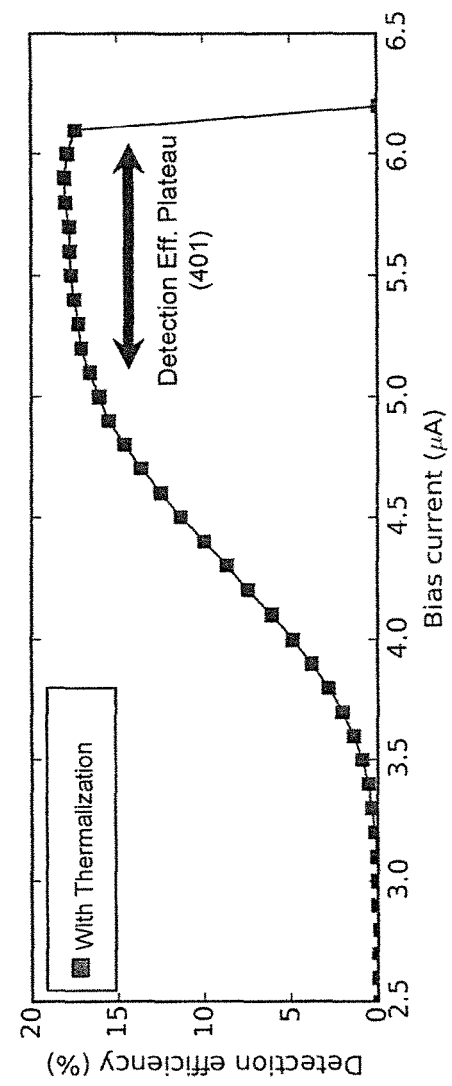
FIG. 4b—is a graph presenting measurements results with a thermalization plate.

FIG. 4 shows, as previously described, that the disclosed invention relies on the exploitation of IMS board technology for cryostat and wire line thermalization. In this figure two graphs are presented based on the characterization of an SNSPD detector without a thermalization plate (a) and with a thermalization plate (b).

These two graphs plot the Detection Efficiency as a function of the bias current in (μA). Experiment without thermalization plate shows that typical saturation plateau can not be obtained above 5.5 μA. In the opposite, with thermalization plate, a detection plateau 401 is obtained from 5.0 μA to 6.2 μA corresponding to the maximum detection efficiency. This detection plateau 401 is clearly one of the characteristics of the single-photon detection regime corresponding to weak signal detection. Moreover, this detection plateau 401 corresponds to the regime where the internal quantum efficiency of the single photon detector is near 100%. Clearly this regime is sought after in applications using SNSPDs since higher detection efficiency typically means better performance. The fact that the saturation plateau without the thermalization plate is smaller, shows that the SNSPD device is being heated by heat flow through the center core of the coaxial cable, which is badly thermalized, hence reducing the performance of the SNSPD. In that specific case, the thermalization plate allow proper functioning of the SNSPD detector

LIST OF REFERENCE SIGNS (100) - Cryostat
(010) - Cryostat cold finger
(020) - T1 cryostat chamber baseline
(030) - Feed through hole
(120) - $2^{nd}$ Cryostat chamber (at T2)
(105) thermalization plate input
(106) thermalization plate output
(108) L thermalization plate wire length
(110) - $3^{rd}$ cryostat chamber (At T3)
(130) - $1^{st}$ Cryostat chamber (at T1)
(131) - Device/Sample
(140) - Mechanical attachment/Thermal drain
(150) Outside cable
(160) wires used for data acquisition
(170) Thermalization plate
(206) Thermalization plate first layer - heat spreader
(205) Second layer - insulating layer
(204) third layer - conducting wires
(203) Fourth layer - solder mask
(202) Fifth layer - solder paste
(301) - First method step
(302) - Second method step
(303) - Third method step
(401) - Detection Efficiency Plateau

The invention claimed is:

1. A cryogenic device comprising at least two chambers at two different temperatures, a first chamber at a first temperature T1 accommodating a sample, and a second chamber at a second temperature T2 greater than T1 and being adapted to accommodate a cooling device, said cooling device being adapted to cool wirelines connecting said sample to an external element, wherein said cooling device is an IMS thermalization plate comprising at least one wire-guide having an input for plugging a wire line connected to the sample and an output for plugging a wire line connected to said external element, said wire-guide being thermally connected to the first chamber.

2. The cryogenic device according to claim 1, wherein said thermalization plate (170) is mounted on a mechanical attachment made of a thermally conductive material and thermally connected to the first chamber.

3. The cryogenic device according to claim 1, wherein the thermalization plate embeds an active device for signal amplification or processing.

4. The cryogenic device according to claim 1, wherein the wirelines are coaxial cables.

5. The cryogenic device according to claim 1, wherein the thermalization plate is located in the second chamber.

6. The cryogenic device according to claim 1, wherein the thermalization plate comprises a first layer comprising a material with high thermal conductivity;
a second layer made of a thin dielectric material as an insulating layer;
a third layer is made of conductive material used for forming circuitry enabling wire thermalization; and
two layers which are a solder mask and a solder paste.

7. The cryogenic device according to claim 1, wherein the thermalization plate is adapted to fit a specific impedance value.

8. The cryogenic device according to claim 1, wherein the chambers are electrically connected to each other through feeding through-holes provided in walls of the chamber.

9. Process for installing an IMS thermalization board inside the cryogenic device of claim 1 comprising the steps of:
- putting the IMS plate in contact with a part of cryostat at T1;
- connecting an output cable on and output connector of the plate;
- connecting an input cable to an input connector on the same wire-guide as the output cable.

* * * * *